C. E. BEACH.
BATTERY CHARGING SYSTEM.
APPLICATION FILED SEPT. 2, 1913.

1,118,099.

Patented Nov. 24, 1914.
4 SHEETS—SHEET 1.

Fig 1

WITNESSES:

INVENTOR
Clarence E. Beach

C. E. BEACH.
BATTERY CHARGING SYSTEM.
APPLICATION FILED SEPT. 2, 1913.

1,118,099.

Patented Nov. 24, 1914.
4 SHEETS—SHEET 3.

WITNESSES:

INVENTOR
Clarence E. Beach,

UNITED STATES PATENT OFFICE.

CLARENCE E. BEACH, OF BINGHAMTON, NEW YORK, ASSIGNOR TO GEORGE O. KAPP, OF NEW YORK, N. Y.

BATTERY-CHARGING SYSTEM.

1,118,099.  Specification of Letters Patent.  Patented Nov. 24, 1914.

Application filed September 2, 1913. Serial No. 787,608.

*To all whom it may concern:*

Be it known that I, CLARENCE E. BEACH, of Binghamton, in the county of Broome and State of New York, have invented certain new and useful Improvements in Battery-Charging Systems, of which the following is a specification.

My invention relates particularly to storage battery charging systems in which it is desirable that the charging time be automatically controlled. In Patent No. 1,082,187 issued to me under date of December 23, 1913, is shown and described a method of supplying suitable charging current to a storage battery. In putting the method described in that patent into effect, a releasing magnet was provided which was adapted to be so connected to the supply circuit as to be originally energized very strongly, then a resistance was placed in series with said magnet, cutting down its excitation nearly to the point where it would release its armature, and the magnet was adapted to so release its armature whenever a predetermined condition of the charging circuit was obtained, or, in this case, whenever the supply voltage dropped below that required to properly overcome the counter-electromotive force of the battery being charged. When this magnet released its armature upon such a diminution of voltage it operated to cause the opening of the connection between the supply circuit and the charging circuit. In Patent No. 689,930 to N. H. Suren dated Dec. 31, 1901, another method is explained, this method being the use of a buzzer effect inherent in the circuit of a supervising magnet connected to the supply circuit to cause the opening of the charging circuit whenever a predetermined condition of the charging circuit was obtained, or, in this case, whenever the current decreased to a certain point.

In my co-pending application No. 782,731 filed Aug. 2, 1913, I have shown a method of determining a length of time of charge of a storage battery and have made use of separate sources of energy to effect the operation of the time mechanism and of the cut-out mechanism.

This application is filed in lieu of an abandoned application filed by me on the fourth day of June, 1912, Serial No. 701,698.

This invention has for its object to have the connection of the supply circuit to the charging circuit simultaneously under two controls; one, that due to the condition of the supply circuit, which disconnects the battery whenever a predetermined condition of the circuit obtains; the other, that due to the charge time control mechanism, which disconnects the battery whenever the time limit is up, this limit being automatically extended for whatever time the battery is disconnected by the first control.

Another object of my invention is to provide a system whereby the energy for exercising both the control due to the condition of the supply circuit and the control due to the charge time control mechanism will be furnished by the supply circuit so as to guard against the failure of either of these controls from failure of any independent source of energy (as, for instance, the failure of local batteries) particularly a failure of the actuating energy for the time control which would permit the charging to proceed indefinitely, with resultant injury to the storage batteries.

A further object of my invention is to insure that so long as the supply circuit is in operative connection with the storage batteries, the energy necessarily present in the supply circuit may be utilized for accomplishing the control of such connection.

A still further object of my invention is to provide a charge time control mechanism which, while operated by energy furnished by the supply circuit while the batteries are being charged, will be automatically cut off from and not waste energy from the supply circuit when the batteries are not being charged.

Another object of my invention is to provide a charge time control mechanism which is adapted for use either with the controlling mechanism shown by the Suren patent No. 689,930 or with the mechanism shown in aforesaid Patent No. 1,082,187 hereinbefore referred to, without any change in the structure of either of said controlling mechanisms.

As applied to the aforesaid Patent No. 1,082,187, these objects are obtained by so connecting the time control system that when it operates it will adjust the circuit of the electromagnetic switch that controls the connection of the charging circuit, while the same electromagnetic switch circuit is also under the control of the releasing magnet and may be controlled by that magnet whenever a predetermined condition of the charging circuit is obtained.

As applied to the Suren patent, the time control system is so connected that when it operates it will adjust the circuit of the magnet which controls the connection of the charging circuit, while this same circuit is also under the control of the supervising magnet through the buzzer effect before referred to and may be controlled by that magnet whenever a predetermined condition of the charging circuit is obtained.

While I am aware of the fact that separate sources of energy for the operation of the electromagnetic apparatus may be utilized in carrying out some of the objects of my invention, I consider it an important part of this invention to provide such a system that the energy of the supply circuit may be utilized for this purpose.

The means used to obtain these objects is shown in the accompanying drawings, in which—

Figure 1 shows the system as applied to the apparatus of the aforesaid Patent No. 1,082,187 before referred to.

Like figures of reference refer to like parts throughout.

Figure 1:
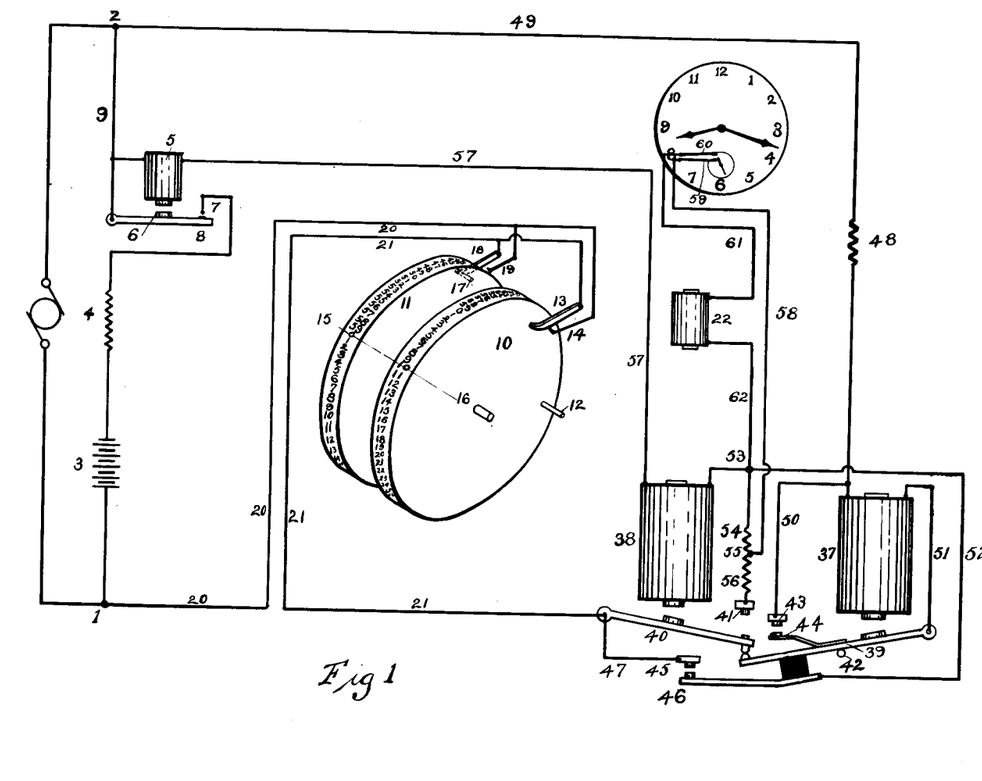

In Fig. 1, 1 and 2 are the terminals of a source of charging current, 3 is a battery to be charged, 4 is the charging rheostat in series with said battery. One end of the battery charging circuit is connected to the terminal 1. When magnet 5 is energized to attract its armature 6, as will be described later, the circuit is completed to terminal 2 through contact 7, switch arm 8 and wire 9.

Suitable time setting mechanism is used, which as here shown comprises two number wheels or disks 10 and 11, bearing on their peripheries numbers indicative of time. As shown, the number wheel 10 has on its periphery the numbers zero to fifty-nine, representative of minutes, and the number wheel 11 likewise bears on its periphery the numbers zero to fifty-nine, but indicative of hours. The wheel 10 has near its periphery a pin 12 for separating contact springs 13 and 14 when the zero indication on this wheel is at the line of sight 15—16. Number wheel 11 has a similar pin 17 for separating contact springs 18 and 19 when the zero indication of this wheel is at the line of sight. The contact springs 13, 14 and 18, 19 are connected in multiple with each other and in series with wires 20 and 21, so that when both number wheels are at zero indication, the circuit including wires 20 and 21 will be open, but will be closed as soon as any one of the number wheels has been set away from zero indication. As shown in Fig. 1, the hour wheel 11 is at zero indication but the minute wheel 10 has been set to the ten indication and its pin 12 has been moved away from contact springs 13 and 14 to thereby close the circuit between wires 20 and 21. As soon as the minute wheel is restored to its normal position, the circuit will again be open at the setting mechanism.

Figure 2:
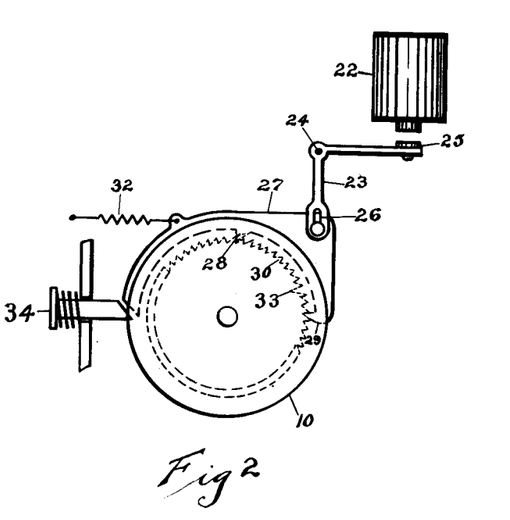
Fig. 2 is a side elevation of the setting mechanism.
Figure 3:
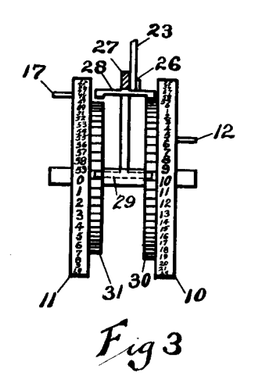
Fig. 3 is a front elevational view of the setting mechanism with the throwout mechanism cut away.

In Figs. 2 and 3 the electromechanical restoring mechanism for the time setting mechanism is shown. This restoring mechanism comprises an impulse magnet and an armature structure therefor for coöperating with the time setting mechanism. This armature structure comprises a bell crank lever 23 pivoted at 24 and carrying the armature 25. Connected to the lower end of the bell crank lever by a pin through the slot 26 is a semi-circular pawl 27. This pawl is provided with two pins 28 and 29 extending across the pawl, the ends of these pins being adapted to engage the two ratchet disks 30 and 31 secured to the inner sides of wheels 10 and 11 respectively. The spring tends to move pawl 27 to the left, in Fig. 2. When a current impulse is sent through the electromagnet 22, the armature structure will be moved about its pivot 24 and the pawl will be moved to the right. Upon the failure of the current, the spring 32 will move the pawl to the left, and the ratchet wheel 30 will be advanced to cause corresponding advancement of the minute wheel 10. The construction is preferably such that for each retraction of the pawl 27 the minute wheel 10 will be given an angular advance equal to the distance between indicating numbers thereon, so that sixty advancements will cause one complete revolution of the minute wheel. As is shown in Fig. 3, ratchet 30 is larger in diameter than ratchet 31. Ordinarily, pin 28 is clear of the teeth of ratchet 31 even when engaging the teeth of ratchet 30. Corresponding to the step from fifty-nine to zero on the minute wheel, however, there is an extra deep notch in the ratchet 30 as shown at 33. When this notch is reached, pin 28 drops into this notch so far that the other end of it also engages a notch of ratchet 31, and the retraction of pawl 27 will then move both the minute and hour wheels one step. This constitutes the carry-over mechanism. The setting button 34 is provided with a beveled end which is adapted to engage the beveled end of pawl 27 to throw the pawl out of engagement whenever it is desired to set the mechanism.

A starting electromagnet 37 and a releasing electromagnet 38 are also provided and control armature levers 39 and 40 respectively. These levers are so mounted that the free end of lever 39 moves in the path of the free end of lever 40 and that lever 39 may support lever 40 at certain times. A stationary contact 41 is provided in the path of the lever 40. A stop 42 is provided in the path of the lever 39. Contact spring 44 carried by and connected to the lever 39 is adapted to engage stationary contact 43. A stationary contact 45 is located in the path of contact spring 46 carried by and insulated from lever 39. Wire 21 connects the contact springs 13 and 18 to the pivot of lever 40, and wire 47 connects said pivot to contact 45. Resistance 48 is connected at one end to terminal 2 by wire 49 and at the other end to one terminal of the magnet 37. Wire 50 connects the same terminal to contact 43. Wire 51 connects the other terminal to the pivot of lever 39. Wire 52 connects contact spring 46 to junction 53, resistance 54 is connected between junctions 53 and 55, and resistance 56 between junction 55 and contact 41. One terminal of magnet 38 is connected to junction 53, the other terminal being connected by wire 57 to one terminal of magnet 5, the other terminal of magnet 5 being connected to wire 9.

Impulse magnet 22 is connected in a series circuit from junction 55 by wire 58 to contact 59, contact 60, wire 61, magnet 22 and wire 62 to junction 53. Resistances 54 and 56 are so proportioned that, when current is flowing through them, the fall of potential from junction 55 to junction 53 is sufficient to provide current to operate magnet 22 when contacts 59 and 60 are closed. While these contacts are shown diagrammatically as being controlled by the second hand of the clock, they would of course in practice be operated by some well known means, such as a cam on the second hand shaft.

The operation of my invention when applied to the apparatus of aforesaid Patent No. 1,082,187 is as follows: Assuming that the minute wheel has been set for a charging time of ten minutes as shown in Fig. 1, and that the various parts are in the positions therein shown, a "starting circuit" exists from terminal 1 to terminal 2 as follows: terminal 1, wire 20, contact springs 14, 13, wire 21, lever 40, lever 39, wire 51, starting magnet 37, resistance 48 and wire 49 to terminal 2. When the potential of the generator is sufficient to cause sufficient current to flow through this circuit to suitably energize magnet 37, its armature lever 39 is raised and the following series of events occurs: contacts 45, 46 made, strongly energizing magnets 38 and 5; contacts 43, 44 made, shunting magnet 37; contacts 39, 40 broken, breaking the "starting circuit"; contacts 40, 41 made, closing the "holding circuit"; contacts 43, 44 broken, removing shunt around magnet 37; contacts 45, 46 broken, removing shunt around resistances 56 and 54.

The "holding circuit" above mentioned may be traced as follows: terminal 1, wire 20, contact springs 14, 13, wire 21, lever 40, contact 41, resistance 56, junction 55, resistance 54, junction 53, magnet 38, wire 57, magnet 5 and wire 9 to terminal 2. Magnet 5 is so designed that it firmly holds its armature 6 to close the circuit through battery 3 even while the resistances 56 and 54 are in series with it, while, on the other hand, these resistances cut down the excitation of magnet 38 to such an extent that a predetermined diminution of the voltage between terminals 1 and 2 will cause this magnet to release its armature and open the circuit at contact 41, deënergizing magnet 5 and hence opening the charging circuit of battery 3. It will be observed that as long as the "holding circuit" exists there is a difference of potential between junction 55 and junction 53. Now as the clock runs, once every minute it will cause the closing of the branch circuit from junction 55, through wire 58, contact 59, contact 60, wire 61, magnet 22, and wire 62 to junction 53 for a short time and during each impulse the magnet 22 is energized, and the armature structure controlled thereby will be operated to restore the minute wheel one division toward normal. After ten minutes the minute number wheel will have advanced ten times and will be restored to zero indication and when such final restoration takes place the pin 12 will again separate the contacts 13 and 14 to open the holding circuit. When this circuit is opened, magnets 5 and 38 will fail, disconnecting the battery and removing the potential from the impulse circuit, so that there will be no further operation of the restoring electromagnet. In the event of any decrease of the supply voltage below the point at which magnet 38 is adjusted to release its armature, the failure of this magnet, by removing the potential from the impulse circuit, will stop the restoration of the time setting mechanism until such time as conditions are again suitable, whereupon magnet 37 will pick up and resume the restoration of the time setting mechanism from the place where it stopped, in the manner already described.

If it were desired to charge the battery for two hours and thirty minutes, the minute wheel would be set ahead to the thirty indication and the hour wheel would be set ahead to the two indication, and upon such setting, both pins 12 and 17 would be removed from their contact springs to close the wires 20, 21. When the terminals 1 and 2 are properly energized, magnets 37 and 38 go through the sequence of operations before described and the impulse magnet will restore the minute wheel step by step. After the minute wheel has been restored a half revolution it will again indicate zero and its pin 12 will open contacts 13 and 14. However, as the pin 17 of the hour wheel 11 is away from its contact springs 18 and 19, the circuit will remain closed and the mechanism will continue to operate. The minute wheel now makes one more step and between the indications zero and fifty-nine the carry-over mechanism will become effective and will advance the hour wheel one division until this wheel indicates one. Both pins still being away from their contact springs, the circuit remains closed and the minute wheel will continue for another revolution, at the end of which revolution the carry-over mechanism again operates and the hour wheel is advanced to zero indication. At one hour, zero minutes contact 18, 19 is closed and contact 13, 14 is open, while at zero hours, fifty-nine minutes contact 18, 19 is open and contact 13, 14 is closed and in order to keep the circuit closed between wires 20, 21 it is necessary to so arrange the mechanism that contact 13, 14 on the minute wheel is made in moving from zero to fifty-nine before contact 18, 19 on the hour wheel is broken in moving from one to zero. The minute wheel will now make another revolution, again returning to zero. Both wheels being now at zero, their pins will both engage with their respective contact springs and the holding circuit will be opened, such opening resulting in the opening of the charging circuit and the removal of the potential from the impulse circuit, as before described. The charging circuit is thus automatically opened and the setting mechanism automatically restored to normal after the charging period of two hours and thirty minutes.

Figure 4:
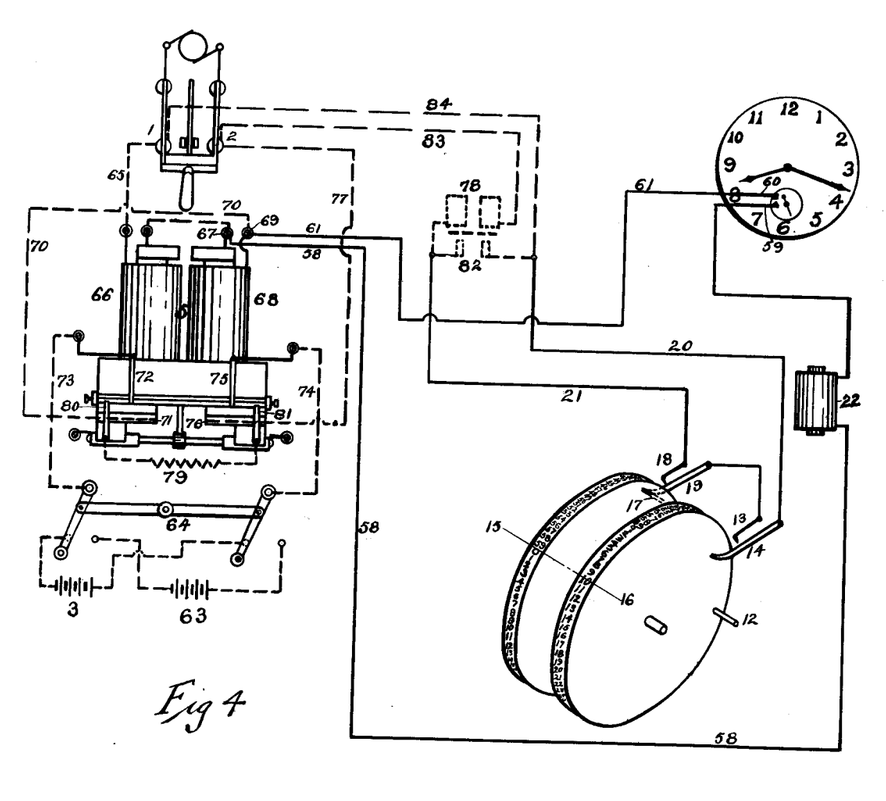
Fig. 4 shows the system as applied to the apparatus of the Suren patent before referred to, and Fig. 5 is a view, partly in section, of the Suren device.
Figure 5:
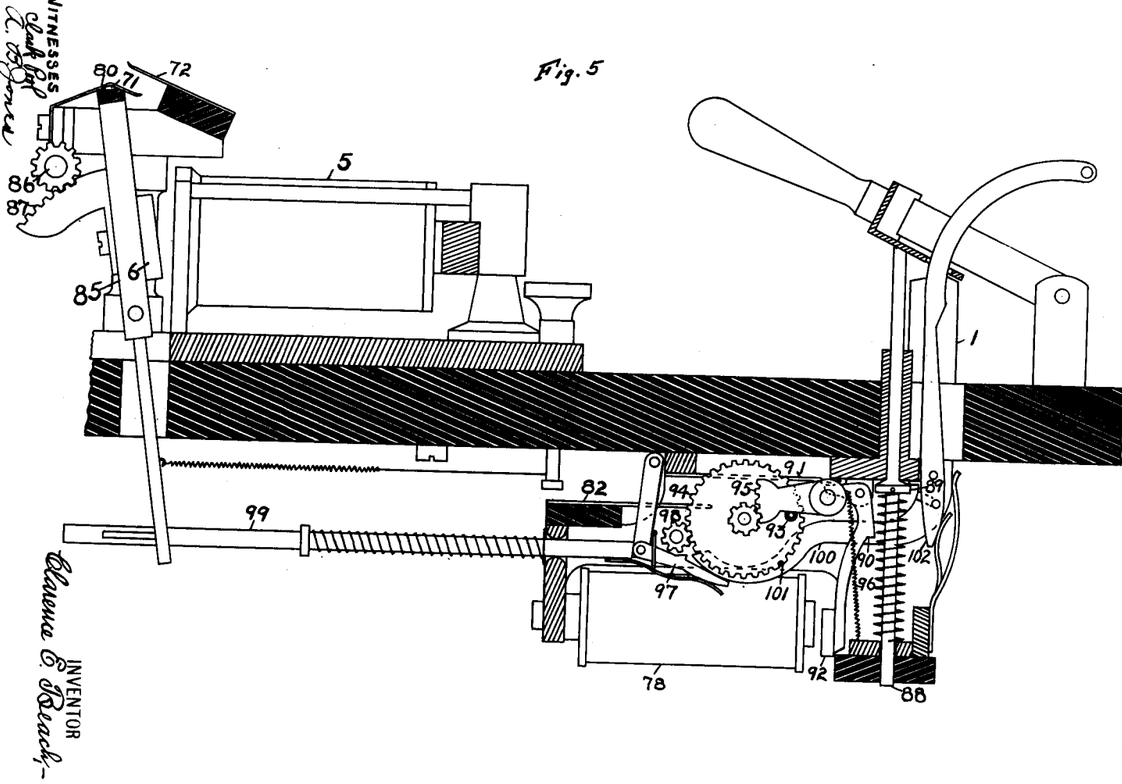

Referring to Fig. 5 which shows the Suren device with the switch open, and to Fig. 4 which shows how my invention may be applied to the Suren device, 1 and 2 are the contact posts of a knife switch which is connected to a supply circuit. A "cut-out" magnet 5 is connected in series in wire 65, connected to post 1. The armature 6 of this magnet is secured to a plate 85, which has mounted thereon, but insulated therefrom, two metallic strips 71 and 76. Contact springs 80 and 81 are secured to a rock-shaft 86, provided with a pinion engaged by sector 87 secured to plate 85. Contact springs 80 and 81 are connected by a wire which includes resistance 79. Contact springs 72 and 75 are suitably mounted upon an insulating plate and are connected by wires 73 and 74 with the arms of a switch 64 which connects either with battery 3 or battery 63. These contact springs 72 and 75 are adapted to be engaged by metallic strips 71 and 76 whenever armature 6 is attracted. When the knife switch is closed, current may flow from the supply circuit to post 1, wire 65, coil 66 of magnet 5, terminal 67, coil 68 of magnet 5, terminal 69, wire 70, metallic strip 71, contact spring 80, resistance 79, contact spring 81, metallic strip 76, wire 77, to post 2. Whenever the current in this circuit is sufficient to energize magnet 5, it attracts its armature 6, operating the rock shaft to break circuit at 71, 80 and 76, 81, and making contact at 71, 72 and 76, 75, completing the charging circuit as follows: from post 1, to wire 65, coil 66 of magnet 5, terminal 67, coil 68 of magnet 5, terminal 69, wire 70, metallic strip 71, contact spring 72, wire 73, left arm of switch 64, battery 3, right arm of switch 64, wire 74, contact spring 75, metallic strip 76, wire 77 to post 2. If the charging current is sufficient to charge the storage battery, armature 6 will remain attracted; but if it should be too weak or the counter electromotive force of the battery too high, the armature will immediately fall away, closing the circuit including resistance 79, whereupon the armature will again be attracted, and as a result will be repeatedly vibrated. This vibratory action of the armature is utilized to automatically open the knife switch. The spring pressed rod 88 is thrust inward, compressing its spring, by means of the knife-switch, when the same is closed by hand. Projection 89 engages detent 90, pivoted to the frame, said detent being pressed up to engage the projection 89 by means of spring 91 bearing upon a projection on the detent. Armature 92 of releasing magnet 78 is attached to an extension of detent 90, and whenever said magnet 78 is energized and its armature attracted the detent 90 will be operated to release the rod 88. Magnet 78 is connected with post 2 by wire 83 and post 1 is connected by wire 84 with a pair of normally open contact springs 82, which when closed complete the circuit of the magnet. The springs 82 are closed by a pin 93 projecting in opposite ways from a tooth wheel 94, but insulated from it. Said wheel 94 is connected to a pinion which engages a sector 95 which under the tension of a spring 96 tends to move the wheel 94 until the insulated pin 93 strikes one edge of said sector, as shown in Fig. 5. Wheel 94 is turned in the opposite direction by means of a pawl 97, which intermittently engages pinion 98, which pinion engages said wheel. Pawl 97 is pivoted to the upper end of a rod 99 which has at its lower end a slot which receives a pin connected with the plate 85, so that as the armature 6 vibrates, rod 99 will be intermittently raised to operate the pawl 97 which engages pinion 98 to move wheel 94. When said wheel has been moved a sufficient number of steps, pin 93 will engage springs 82 and close the circuit of the releasing magnet 78. The spring operated detent lever 100 is provided with a detent pin 101 which may engage with any one of the notches of wheel 94 and yieldingly hold said wheel. Lever 102 is provided to release said detent lever 100 when the switch is operated.

The time setting mechanism is identical with that shown in Fig. 1, but the circuit is somewhat different. In Fig. 4 the pin 12 on the minute wheel 10 is adapted to close the contact springs 13 and 14 when the zero indication is at the line of sight. Pin 17 is similarly adapted to close contact springs 18 and 19. The contact springs 13, 14 and 18, 19 are connected serially with the releasing magnet 78, so that when both number wheels are at zero indication, the circuit including this magnet will be closed, but will be opened as soon as any one of the number wheels has been set away from zero indication.

Impulse magnet 22 is connected in a series circuit from terminal 67 by wire 58 to magnet 22, contact 59, contact 60, and wire 61 to terminal 69. The fall of potential from terminal 67 to terminal 69 provides sufficient current to operate magnet 22 when contacts 59 and 60 are closed.

The operation of the system when applied to the apparatus of the Suren patent will now be described. As shown in Fig. 4, the minute wheel has been set for a charging time of ten minutes. When the main switch is closed a "starting" circuit exists from terminal 1 to terminal 2 as follows:—terminal 1, wire 65, coil 66, terminal 67, coil 68, terminal 69, wire 70, metallic strip 71, contact spring 80, resistance 79, contact spring 81, metallic strip 76, and wire 77 to terminal 2. Assuming suitable charging conditions, as heretofore explained, the operation of magnet 5 closes the charging circuit which has been traced before. It will be observed that there is now a difference of potential between terminals 67 and 69. Now as the clock runs, its second hand will once every minute close the branch circuit from terminal 67, through wire 58, magnet 22, contact 59, contact 60 and wire 61 to terminal 69 for a short time and during each impulse the magnet 22 is energized, and the armature structure controlled thereby will be operated to restore the minute wheel one division toward normal. After ten minutes the minute number wheel will have advanced ten times and will be restored to zero indication and when such final restoration takes place the pin 12 will again close the contacts 13 and 14 to close the releasing circuit. This circuit is as follows: from terminal 1, to wire 84, wire 20, contact 14, contact 13, contact 19, contact 18, wire 21, magnet 78, and wire 83 to terminal 2. Magnet 78 trips the knife switch, disconnecting the battery and removing the potential from the impulse circuit, so that there will be no further operation of the restoring electromagnet.

I claim the following:—

1. In a storage battery system, the combination of a supply circuit, a charging circuit, cut-out mechanism therefor, means for indicating a desired length of time of charge, means for operating said cut-out mechanism upon zero indication, means for restoring said indicating means toward zero indication as the time of charging elapses, and means for stopping said restoration whenever a predetermined condition of the supply circuit is obtained.

2. In a storage battery system, the combination of a supply circuit, a charging circuit, means for indicating a desired length of time of charge, means for restoring said indicating means toward zero indication, a connection between said circuits, means for causing the opening of said connection upon zero indication, and means controlled by the supply circuit for causing the opening of said connection and for stopping said restoration whenever a predetermined condition of the supply circuit is obtained.

3. In a storage battery system, the combination of a supply circuit, a charging circuit, cut-out mechanism therefor, means for indicating a desired length of time of charge, means for operating said cutout mechanism upon zero indication, mechanism for restoring said indicating means toward zero indication as the time of charging elapses, means for stopping said restoration whenever a predetermined condition of the supply circuit is obtained, and a time controlled electromagnet for controlling said restoring mechanism.

4. In a storage battery system, the combination of a supply circuit, a charging circuit, cut-out mechanism therefor, means for indicating a desired length of time of charge, means for operating said cut-out mechanism upon zero indication, mechanism for restoring said indicating means toward zero indication as the time of charging elapses, means for controlling said restoration whenever a predetermined condition of the supply circuit is obtained, an electromagnet for operating said restoring mechanism and a time circuit therefor energized by said supply circuit.

5. In a storage battery system, the combination of a supply circuit, a charging circuit, cut-out mechanism therefor, a magnet connected to said supply circuit, means for indicating a desired length of time of charge, means operated by said indicating means for causing the actuation of said cut-out mechanism upon zero indication, means for restoring said indicating means toward zero indication as the time of charging elapses, and means controlled by said magnet for operating said cut-out mechanism and for stopping said restoration whenever a predetermined condition of the supply circuit is obtained.

6. In a storage battery system, the combination of a supply circuit, a charging circuit, cut-out mechanism therefor, a magnet connected to said supply circuit, means for indicating a desired length of time of charge, means operated by said indicating means for causing the actuation of said cut-out mechanism upon zero indication, mechanism for restoring said indicating means toward zero indication as the time of charging elapses, means controlled by said magnet for operating said cutout mechanism and for stopping said restoration whenever a predetermined condition of the supply circuit is obtained, an electromagnet controlling said restoring mechanism and a time circuit therefor.

7. In a storage battery system, the combination of a supply circuit, a charging circuit, means for indicating a desired length of time of charge, means for restoring said indicating means toward zero indication, means for operating said restoring means only while said charging circuit is connected to said supply circuit, a connection between said circuits, means for causing the opening of said connection upon zero indication, and means controlled by the supply circuit for causing the opening of said connection whenever a predetermined condition of the supply circuit is obtained.

8. In a storage battery system, the combination of a supply circuit, a charging circuit, cut-out mechanism therefor, a magnet connected to said supply circuit, means controlled by said magnet for operating said cut-out mechanism whenever a predetermined condition of the supply circuit is obtained, means for indicating a desired length of time of charge, means operated by said indicating means for causing the actuation of said cut-out mechanism upon zero indication, means for restoring said indicating means toward zero indication as the time of charging elapses, and means for operating said restoring means only while said charging circuit is connected to said supply circuit.

9. In a storage battery system, the combination of a supply circuit, a charging circuit, cut-out mechanism therefor, a magnet connected to said supply circuit, means controlled by said magnet for operating said cut-out mechanism whenever a predetermined condition of the supply circuit is obtained, means for indicating a desired length of time of charge, means operated by said indicating means for causing the actuation of said cut-out mechanism upon zero indication, mechanism for restoring said indicating means toward zero indication as the time of charging elapses, an electromagnet controlling said restoring mechanism, a time circuit therefor, and means for energizing said time circuit only while said charging circuit is connected to said supply circuit.

10. In a storage battery system, the combination of a supply circuit, a charging circuit, cut-out mechanism therefor, a magnet connected to said supply circuit, means controlled by said magnet for operating said cut-out mechanism, means for indicating a desired length of time of charge, means for operating said cut-out mechanism upon zero indication, mechanism for restoring said indicating means toward zero indication as the time of charging elapses, an electromagnet controlling said mechanism, an impulse circuit therefor, means energized by said supply circuit for controlling the operativeness of said restoring mechanism and means for impressing time impulses upon said impulse circuit.

11. In a storage battery system, the combination of a supply circuit, a charging circuit, cut-out mechanism therefor, a time indicating member having a ratchet, a pawl adapted to engage said ratchet, means controlled by said indicating member for operating said cut-out mechanism, means for operating said pawl, and means dependent upon a predetermined condition of the supply circuit for controlling the operation of said pawl.

In witness whereof, I hereunto subscribe my name, this 28th day of August, A. D., 1913.

CLARENCE E. BEACH.

Witnesses:
C. M. CONNERTON,
A. L. PECK.

It is hereby certified that in Letters Patent No. 1,118,099, granted November 24, 1914, upon the application of Clarence E. Beach, of Binghamton, New York, for an improvement in "Battery-Charging Systems," the name of the assignee was erroneously written and printed as "George O. Kapp," whereas said name should have been written and printed as *George O. Knapp;* and that the said Letters Patent should be read with this correction therein that the same may conform to the record of the case in the Patent Office.

Signed and sealed this 15th day of December, A. D., 1914.

[SEAL.]

J. T. NEWTON,
*Acting Commissioner of Patents.*